(12) United States Patent
Milosavljevic et al.

(10) Patent No.: US 10,975,761 B2
(45) Date of Patent: Apr. 13, 2021

(54) DEVICE FOR COMPRESSING A FLUID, DRIVEN BY AN ELECTRIC MACHINE WITH A ROTOR SHAFT HAVING A NON-MAGNETIC SHRINK RING

(71) Applicants: IFP Energies nouvelles, Rueil-Malmaison (FR); MAVEL S.r.l., Pont Saint Martin (IT)

(72) Inventors: Misa Milosavljevic, Eragny sur Oise (FR); Thomas Valin, Rueil Malmaison (FR); Fabrice Le Berr, Rueil Malmaison (FR); Stephane Venturi, Roiffieux (FR); Benjamin Gaussens, Buc (FR); Julien Boisson, Rueil Malmaison (FR); Abdenour Abdelli, Bougival (FR); Luca Favre, Valpelline (IT)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 37 days.

(21) Appl. No.: 16/209,333

(22) Filed: Dec. 4, 2018

(65) Prior Publication Data
US 2019/0170062 A1    Jun. 6, 2019

(30) Foreign Application Priority Data

Dec. 4, 2017  (FR) .................................... 17/61.576

(51) Int. Cl.
*F02B 39/10* (2006.01)
*F02C 6/12* (2006.01)
(Continued)

(52) U.S. Cl.
CPC ................ *F02B 39/10* (2013.01); *F02C 6/12* (2013.01); *H02K 1/2733* (2013.01); *F02B 37/10* (2013.01);
(Continued)

(58) Field of Classification Search
CPC .......... H02K 1/2733; H02K 7/14; H02K 1/02; H02K 1/27; H02K 1/2706; F05D 2220/40;
(Continued)

(56) References Cited

U.S. PATENT DOCUMENTS

| | | |
|---|---|---|
| 5,870,894 A | 2/1999 | Woollenweber et al. |
| 5,906,098 A | 5/1999 | Woollenweber et al. |

(Continued)

FOREIGN PATENT DOCUMENTS

| | | |
|---|---|---|
| EP | 0874953 A1 | 11/1998 |
| EP | 0912821 A1 | 5/1999 |

(Continued)

OTHER PUBLICATIONS

Office Action issued against corresponding EP Patent Application No. 18206368.5 dated Nov. 18, 2020 in French (5 pages).

*Primary Examiner* — Dominick L Plakkoottam
(74) *Attorney, Agent, or Firm* — Fitch, Even, Tabin & Flannery LLP

(57) ABSTRACT

The present invention relates to a compression device driven by an electric machine, for which the rotor (1) comprises a rotor shaft (31), a cylindrical magnet (34), and a non-magnetic shrink ring (33). According to the invention, the rotor shaft (31) includes a bore (36) for inserting one end of the compressor shaft (3) to unitize the two shafts.

15 Claims, 2 Drawing Sheets

(51) Int. Cl.
*H02K 1/27* (2006.01)
*F02B 37/10* (2006.01)
*H02K 5/22* (2006.01)
*H02K 7/14* (2006.01)

(52) U.S. Cl.
CPC ...... *F05D 2220/40* (2013.01); *F05D 2220/76* (2013.01); *H02K 5/225* (2013.01); *H02K 7/14* (2013.01)

(58) Field of Classification Search
CPC .... F04D 25/024; F04D 25/06; F04D 25/0606; F04D 25/064; F04D 29/053; F04D 29/266; F04D 29/284
See application file for complete search history.

(56) References Cited

U.S. PATENT DOCUMENTS

| | | | |
|---|---|---|---|
| 6,449,950 B1 | 9/2002 | Allen et al. | |
| 7,360,361 B2 | 4/2008 | Prusinski et al. | |
| 8,157,543 B2 | 4/2012 | Shimizu | |
| 8,882,478 B2 | 11/2014 | Shimizu | |
| 2004/0005228 A1* | 1/2004 | Agrawal | F04D 29/053 417/365 |
| 2008/0289333 A1 | 11/2008 | Godeke et al. | |
| 2009/0195102 A1* | 8/2009 | Shibui | H02K 1/2733 310/156.28 |
| 2010/0019599 A1* | 1/2010 | Saban | H02K 3/28 310/156.12 |
| 2010/0247342 A1 | 9/2010 | Shimizu et al. | |
| 2011/0243485 A1* | 10/2011 | Kume | F16C 17/024 384/106 |
| 2013/0043745 A1 | 2/2013 | Hussain et al. | |
| 2013/0169074 A1 | 7/2013 | Hussain et al. | |
| 2014/0186745 A1* | 7/2014 | Metz | F04D 29/057 429/514 |
| 2014/0373532 A1 | 12/2014 | Diemer et al. | |
| 2018/0062467 A1* | 3/2018 | Barthes | F02B 39/10 |

FOREIGN PATENT DOCUMENTS

| | | |
|---|---|---|
| EP | 1995429 A1 | 11/2009 |
| WO | 2007072536 A1 | 6/2007 |

* cited by examiner

DEVICE FOR COMPRESSING A FLUID, DRIVEN BY AN ELECTRIC MACHINE WITH A ROTOR SHAFT HAVING A NON-MAGNETIC SHRINK RING

CROSS REFERENCE TO RELATED APPLICATIONS

Reference is made to French Application No. 17/61.576 filed Dec. 4, 2017, which is incorporated herein by reference in its entirety.

BACKGROUND OF THE INVENTION

Field of the Invention

The present invention relates to compression devices driven by electric machines and in particular the invention relates to a turbocharger driven by an electric machine. Moreover it relates in particular to a device for compressing a gaseous fluid, air herein, by use of a compressor, alone or connected to a turbine to provide a turbocharger, in order to then send the compressed fluid to all types of apparatus and in particular to the inlet of an internal combustion engine.

Description of the Prior Art

In fact, as is widely known, the power delivered by an internal combustion engine is dependent on the quantity of air introduced into the combustion chamber engine with a quantity of air that is itself proportional to the density of the air. Thus, it is usual to increase this quantity of air by compressing the outside air before it is admitted into the combustion chamber when there is a need for high power. This operation, called supercharging, can be carried out by any means, such as a compressor alone, electrically driven by an electric machine (electric compressor), or by a compressor combined with a turbine and an electric machine in order to form an electric turbocharger.

In the two abovementioned cases, the electric machine combined with the compressor can be of two types.

One of these types is an electric machine with a small air gap and windings close to the rotor which allows optimal guidance of the magnetic flux and optimized efficiency. This type of electric machine has the advantage of a certain compactness, which can sometimes pose a problem for the cooling thereof, requiring the use of a specific system for exhausting the losses thereof.

In order to not to interact with the air inlet of the compressor, this type of electric machine is conventionally positioned on the back of the compressor in the case of an electric compressor, or between the compressor and the turbine in the case of an electric turbocharger, despite the presence of an unfavorable thermal environment in the latter case of it being close to the turbine. Generally, the connection between the compressor, the turbine and the electric machine is rigid. This type of machine can also be positioned on the compressor side but at a distance relatively remote from the air inlet in order not to interfere with the latter. The connection between the compressor and the machine is then rigid or accomplished using a mechanical or magnetic coupling.

This type of system is best described in patents and published patent applications: US 2014/0373532, U.S. Pat. Nos. 8,157,543, 8,882,478, US 2010/0247342, U.S. Pat. Nos. 6,449,950, 7,360,361, EP 0,874,953 or EP 0,912,821.

Another of this type of machine is an electric machine with a large air gap (called an "Air Gap" machine). The air gap can sometimes measure several centimeters in order to allow the working fluid to pass into the air gap. This allows the closest possible integration of the compression systems, in a much more favorable thermal environment.

However, this electric machine arrangement has the disadvantage of disturbing and limiting the passage of the magnetic flux between the rotor and the stator through the large air gap, which contributes to limiting the intrinsic efficiency of the electric machine as well as its specifications (power to weight ratio and power density). The high losses on this type of design also necessitate the development of specific cooling for exhausting the heat from the rotor and from the stator or a limitation on the specifications.

This type of electric machine is in particular described in patents or published patent applications: EP 1,995,429, US 2013/169074 or US 2013/043745.

One of the problems of electrifying the compressors relates to the design of the rotor and its connection to the compressor shaft. This design is often complex (using screws) and does not allow good coaxiality of the rotor and the compressor shaft (in particular due to a short centering) thus limiting the maximum speed achievable by the complete system.

SUMMARY OF THE INVENTION

In order to overcome these drawbacks, the present invention relates to a compression device driven by an electric machine, for which the rotor comprises a rotor shaft, a cylindrical magnet, and a non-magnetic shrink ring. According to the invention, the rotor shaft includes a bore for inserting one end of the compressor shaft therein. Thus, the design of the rotor is simple, and its connection with the compressor shaft is easily implemented.

The present invention relates to a compression device for a fluid driven by an electric machine. The electric machine comprises a rotor and a stator and the compression device comprises a compressor shaft on which is mounted at least one impeller wheel. The rotor is fastened to the compressor shaft. The rotor comprises a rotor shaft, a cylindrical magnet mounted on at least a part of the rotor shaft, a shrink ring of non-magnetic material to hold the magnet on the rotor shaft and the rotor shaft includes a bore for inserting one end of the compressor shaft.

According to an embodiment, the rotor has an outer diameter less than or equal to the diameter of the inlet of the impeller wheel.

Advantageously, the rotor includes at least one non-magnetic stop on a side of the magnet.

According to an aspect, the shrink ring is produced from titanium or carbon.

According to an embodiment, the rotor includes a portion having a reduced diameter with respect to the end intended for fastening to the compressor shaft, and in which the magnet is mounted on the portion having a reduced diameter.

According to a distinguishing feature, the rotor includes a flat surface in contact with a flat end surface of the impeller wheel.

According to an embodiment, the rotor includes a cylindrical portion inserted into the impeller wheel.

Advantageously, the cylindrical portion of the rotor has an axial length substantially equal to 1.5 times at least the diameter of the compressor shaft.

Alternatively, the compression device comprises a tubular sleeve mounted on the compressor shaft and arranged between one end of the impeller wheel and the cylindrical portion of the rotor.

According to an aspect, the rotor is fastened to the compressor shaft by a screw thread.

Preferably, the rotor includes a handling adapter in order to rotate the rotor.

Advantageously, the handling adapter is removable.

Preferentially, the compression device is a turbocharger combining a turbine and a compressor and in particular for an internal combustion engine of a vehicle, or a microturbine.

Advantageously, the electric machine is arranged in the gas admission of the turbocharger.

According to an aspect, the electric machine is a machine with a stator grid.

Moreover, the invention relates to a method for manufacturing a compression device driven by an electric machine, the electric machine comprising a rotor and a stator, and the compression device comprising a compressor shaft and an impeller wheel. For this method, the following steps are implemented:
a) the impeller wheel is mounted on the compressor shaft;
b) a cylindrical magnet is mounted on at least a part of a rotor shaft;
c) the cylindrical magnet is held on the rotor shaft by a non-magnetic shrink ring; and
d) one end of the compressor shaft is inserted into a bore of the rotor shaft, and the compressor shaft is fastened to the rotor shaft by rotating male screw threads at the end of the compressor shaft to engage female threads in the bore of the rotor shaft.

According to an embodiment, during the step of inserting the compressor shaft into the bore of the rotor shaft, the rotor abuts the impeller wheel by use of flat surfaces in contact.

According to an embodiment, during the step of inserting the compressor shaft into the bore of the rotor shaft, a cylindrical portion of the rotor is inserted into the impeller wheel.

Advantageously, the rotor shaft is fastened to the compressor shaft by threading.

Preferably, the rotor is turned by a handling adapter.

BRIEF DESCRIPTION OF THE DRAWINGS

Other characteristics and advantages of the device according to the invention will become apparent on reading the description below of embodiments which are in no way limitative, and with reference to the attached drawings described below.

DETAILED DESCRIPTION OF THE INVENTION

Figure 1:
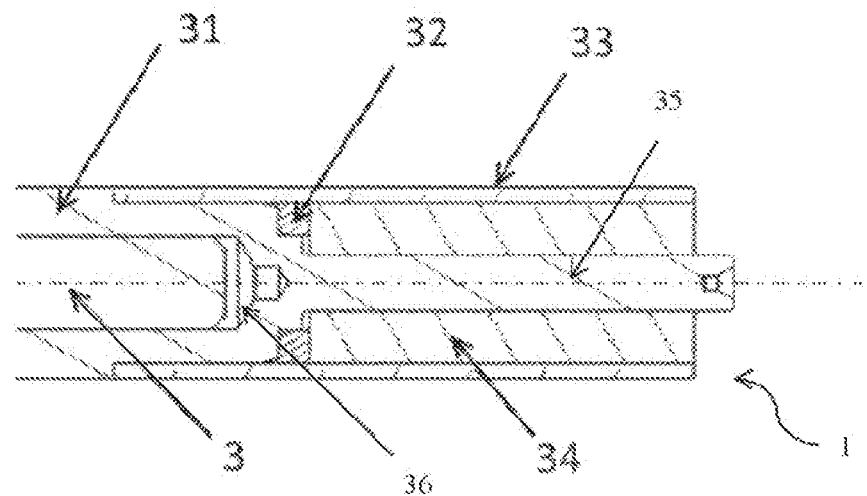
FIG. 1 shows a rotor of an electric machine according to an embodiment of the invention.

The present invention relates to a compression device for a fluid, in particular a gas, driven by an electric machine. In order words, the invention relates to the assembly formed by the electric machine and the compression device. Preferably, the compression device is intended for compressing air.

The compression device for a fluid comprises [a shaft called] a compressor shaft, on which is mounted an impeller wheel (also called a blade).

The electric machine comprises a rotor and a stator. The rotor is fastened to the compressor shaft, in order to transmit or pass the torque from the electric machine to the compressor shaft and to the impeller wheel and vice versa.

According to the invention, the rotor includes: a rotor shaft; which is intended to be fastened to the compressor shaft and is intended to support the active parts of the rotor of the electric machine, ensuring that these different rotating elements are coaxial; a cylindrical magnet, which is mounted on at least a part of the rotor shaft and preferably the cylindrical magnet is mounted on one end of the rotor shaft that is opposite to the end of the rotor shaft by which the rotor is fastened to the compressor shaft with the magnet interacting with windings of the stator in order to create the rotational movement of the rotor; a shrink ring of non-magnetic material which compresses the magnet and axially holds the magnet on the rotor shaft with the shrink ring possibly having a shape that is substantially cylindrical surrounding the cylindrical magnet and at least a part of the rotor shaft. In addition, the non-magnetic material makes it possible to avoid magnetic leakages.

In addition, the rotor shaft includes at one end a bore for inserting one end of the compressor shaft which is threaded. This bore is preferably along the axis of the rotor shaft, which allows good alignment of the two (rotor and compressor) shafts.

According to an embodiment of the invention, the rotor can also include a non-magnetic stop on at least one side of the magnet. This non-magnetic stop makes possible avoiding magnetic leakages from the magnet to the rotor shaft. The non-magnetic stop can also act as a thermal barrier in order to protect the temperature-sensitive magnet. This non-magnetic stop can have the form of a ring inserted between a shoulder of the rotor shaft and the cylindrical magnet.

According to an aspect of the invention, the rotor is fastened to the compressor shaft by a screw thread. To this end, a male thread can be provided on the end of the compressor shaft and a female thread can be provided inside the bore of the rotor shaft. This threaded fastening by threading is simple to implement and allows a rigid connection of the rotor shaft to the compressor shaft.

For this embodiment using a screw thread to attach the compressor shaft to the rotor shaft, the rotor can include a manipulation adapter intended to facilitate the "screwing" of the compressor shaft into the rotor. According to an embodiment example, the manipulation adapter can have a twelve-sided recess or any other system minimizing the inertia and the aerodynamic impact on the airstream, in order to facilitate assembly. Advantageously, the handling adapter can be removable, in particular by means of a screwed assembly. The removable character of the handling adapter makes it possible to produce a rotor with a constant outer diameter, once the rotor is fastened to the compressor shaft, and to minimize the mass of the rotor in operation.

Alternatively, fastening the rotor shaft to the compressor shaft can be carried out by any other means. For example, this fastening can be carried out by pins and screws.

According to a characteristic of the invention, the shrink ring can be made from titanium or carbon, or any other material with suitable mechanical and non-magnetic properties.

According to an aspect, the rotor shaft can be made from magnetic material, for example AISI 420 or APX4.

Preferably, the electric machine can be mounted on the side of the admission of the compression device.

According to an embodiment of the invention, the rotor (in this case, the shrink ring) has an outer diameter less than or equal to the diameter of the inlet of the impeller wheel. In this way, the flow of gas at the inlet of the compression device is not hampered by the rotor shaft.

According to an implementation of the invention, the rotor shaft can include a portion having a reduced diameter with respect to the end of the rotor shaft intended for fastening to the compressor shaft. In this case, the magnet can be mounted on this portion having a reduced diameter. Advantageously, the shrink ring has an outer diameter which corresponds to the diameter of the compression system at the inlet of the latter. Thus, the diameter of the rotor is a diameter that is limited and smooth (of constant outer diameter), which allows the air flow at the inlet of the compression device to be hampered as little as possible by the rotor (continuity of the diameter between the rotor and the inlet of the compression system).

In order to promote the mounting and the positioning of the parts, the rotor can comprise a flat surface that is in contact with a flat end surface of the impeller wheel. In addition, this characteristic makes it possible to arrange the rotor as close as possible to the compression device.

According to an embodiment of the invention, the rotor can include a cylindrical portion inserted into the impeller wheel. This cylindrical portion surrounds the compressor shaft and is inserted into the bore of the impeller wheel. This cylindrical portion ensures a long centering of the rotor with respect to the compressor shaft, which allows better coaxiality of the two shafts. The cylindrical portion can have a reduced outer diameter with respect to the outer diameter of the rotor.

Advantageously, the cylindrical portion has an axial length that is greater than or equal to 1.5 times the diameter of the compressor shaft within the impeller wheel, in order to allow optimized long centering.

According to a first variant of this embodiment, the cylindrical portion has an axial length that corresponds substantially to the axial length of the impeller wheel which allows a maximal long centering and stiffening the impeller wheel particularly for high rotation speeds. This configuration makes it possible in particular to stiffen the portion of the shaft under the compressor wheel that can be a critical point for certain bending modes.

According to a second variant of this embodiment, a tubular sleeve can be mounted on the compressor shaft and be inserted into the impeller wheel and stops against the cylindrical portion of the rotor on one side, and on the ring of the guide device of the compressor shaft. In this way, the impeller wheel rests on the tubular sleeve and on the cylindrical portion, without contacting the compressor shaft. This embodiment variant allows an optimized long centering and stiffening of the impeller wheel, in particular for high rotation speeds. This configuration makes it possible in particular to stiffen the portion of the shaft under the compressor wheel that can be a critical point for certain bending modes. This solution also makes it possible to limit the contact between different materials. According to an embodiment example, the tubular sleeve can comprise a flange in order to increase the stiffening of the impeller wheel.

According to an implementation of the invention, the compression device is a turbocharger and in particular for an internal combustion engine of a vehicle. It is thus a turbocharger driven by an electric machine. In this case, the compressor shaft corresponds to the shaft of the turbocharger which connects the turbine of the turbocharger to the compressor of the turbocharger. Thus, the electric machine drives both the compressor and the turbine.

According to a variant of this embodiment of the invention, the electric machine can be arranged to admit gas (generally air) into the turbocharger system. The advantage of this solution is twofold: the electric machine can be cooled by the flow of admitted gas, and the admitted gas is heated by the electric machine, which can be favorable in certain modes of operation of the internal combustion engine.

Preferably, the electric machine can be an electric machine with a stator grid, i.e. an electric machine having a stator with stator teeth around which are mounted windings; these stator teeth having large dimensions in order to allow the airflow to pass. Such a machine with a stator grid is described in particular in patent applications WO2013/050577 and FR 3048022.

FIG. 1 shows, diagrammatically and not in a limiting manner, an embodiment of a rotor 1 according to the invention. For the embodiment shown, the rotor 1 comprises a rotor shaft 31, a cylindrical magnet 34, a shrink ring 33, and a non-magnetic stop 32. The rotor shaft 31 includes on one side a bore 36 for inserting the compressor shaft 3 (partially shown). The compressor shaft 3 can comprise a male thread (not shown), and the bore 36 can comprise a female thread (not shown) engaging with the male thread of the compressor shaft 3. On the other side, the rotor shaft 31 includes a portion 35 having a reduced diameter with respect to the diameter of the rotor shaft 31 on the first side. The cylindrical magnet 34 is mounted on this portion having a reduced diameter. The magnet 34 comes to a stop axially against a non-magnetic stop 32. The non-magnetic stop 32 has substantially the shape of a ring. The non-magnetic stop 32 is arranged in a shoulder of the rotor shaft 31. A non-magnetic shrink ring 33 (for example of carbon or titanium) is placed around the magnet 34. The non-magnetic shrink ring 33 compresses the magnet 34 and holds the magnet 34 axially in position on the rotor shaft 31. The non-magnetic shrink ring 33 has an outer diameter which corresponds to the maximum diameter of the rotor shaft 31. The rotor thus formed has a "smooth" cylindrical shape (of constant outer diameter). The rotor can also comprise a handling adapter (not shown).

Figure 2:
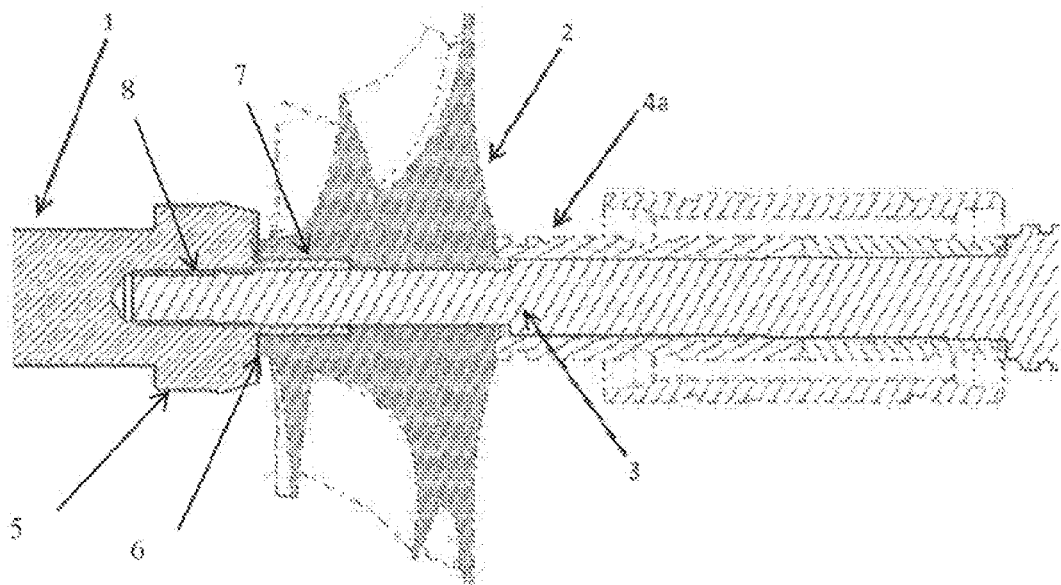
FIG. 2 shows a compression device driven by an electric machine according to a first embodiment of the invention.

FIG. 2 shows, diagrammatically and not in a limiting manner, a compression device (in particular a turbocharger) according to a first embodiment of the invention. In this figure, the different components of the rotor 1, that is the rotor shaft, the magnet, the shrink ring and optionally the non-magnetic stop, are not shown. The turbine part of the turbocharger is also not shown. FIG. 2 shows a system for assembling the electric rotor 1, on the turbocharger shaft 3 while ensuring a rigid connection of the assembly and in particular of the compressor wheel 2. In this case, after mounting a bearing 4a, the compressor wheel 2 is positioned on the turbocharger shaft 3 via radial centering, and until axial contact is made with the inner ring of the bearing 4a. The rotor 1 may also comprise a handling adaptor.

The bore of the impeller wheel 2 can be enlarged on the side opposite the bearing 4. This modification (with respect to a conventional impeller wheel) is (advantageously) carried out without damaging the mechanical strength of the impeller wheel 2.

The bore of the rotor 1 of the electric machine is equipped with a female thread, into which the turbocharger shaft 3 is screwed by means of the male thread 8 of the compressor shaft. The positioning of this electric rotor 1 is carried out via a long centering interacting with the compressor shaft 3, by means of the cylindrical portion 7 of the rotor 1. A mechanical clearance can exist between the bore of the compressor wheel 2 and the centering cylinder 7 of the rotor shaft 1 of the electric machine. The cylindrical portion 7 represents approximately 1.5 times the diameter of the compressor shaft. This ensures that the entire shaft of the electric turbocharger is coaxial. The axial positioning of the electric rotor 1 is carried out via a planar joint against the flat surface 6 of the head (of the inlet) of the compressor wheel 2. There can be a mechanical clearance between the bottom of the bore of the compressor wheel 2 and the centering cylinder of the rotor 1 of the electric machine. The rigid connection of the rotor of the electric machine 1 on the turbocharger shaft 3 and the axial preloading of the inner ring of the bearing of the turbocharger 4a is carried out by interference (friction).

Figure 3:
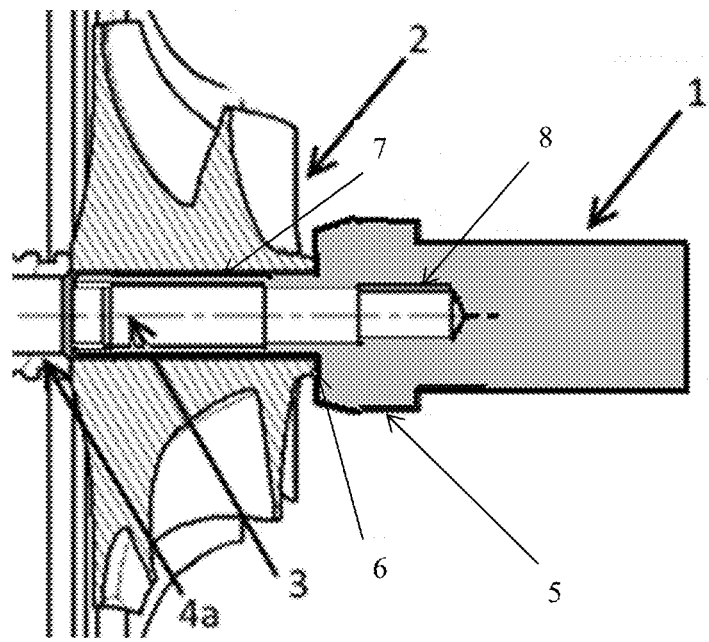
FIG. 3 shows a compression device driven by an electric machine according to a second embodiment of the invention.

FIG. 3 shows, diagrammatically and not in a non-limiting manner, a compression device (in particular a turbocharger) according to a second embodiment of the invention. In this figure, the different components of the rotor 1, that is the rotor shaft, the magnet, the shrink ring and optionally the non-magnetic stop, are not shown. The turbine part of the turbocharger is also not shown. FIG. 3 shows a system of assembling the electric rotor 1 on the turbocharger shaft 3 while ensuring the immobilization of the assembly and in particular of the compressor wheel 2. The elements identical to FIG. 2 will not be described in detail. The second embodiment in FIG. 3 differs from the first embodiment in FIG. 2 by the fact that the cylindrical portion 7 has a length substantially equal to the axial length of the impeller wheel 2, maintaining a mechanical clearance between the inner ring of the bearing 4a and its end. For this embodiment, the impeller wheel 2 includes an inner bore with a diameter greater than the conventional impeller wheel 2. In addition, the impeller wheel 2 is mounted directly on the cylindrical portion 7 of the rotor 1. Using such a structure of rotor 1 of an electric machine with a suitable material makes it possible to increase the stiffness of the portion of the turbocharger shaft 3 in order to make the structure less sensitive to unsafe bending modes. In this architecture, the impeller wheel 2, generally of aluminum, is found at the interface between the rotor of the electric machine 1 and the inner ring of the bearing 4a, the rotor 1 and the inner ring of the bearing 4a being generally made from steel. The rotor 1 may comprise a threaded bore for receiving a threaded handling adaptor 5.

Figure 4:
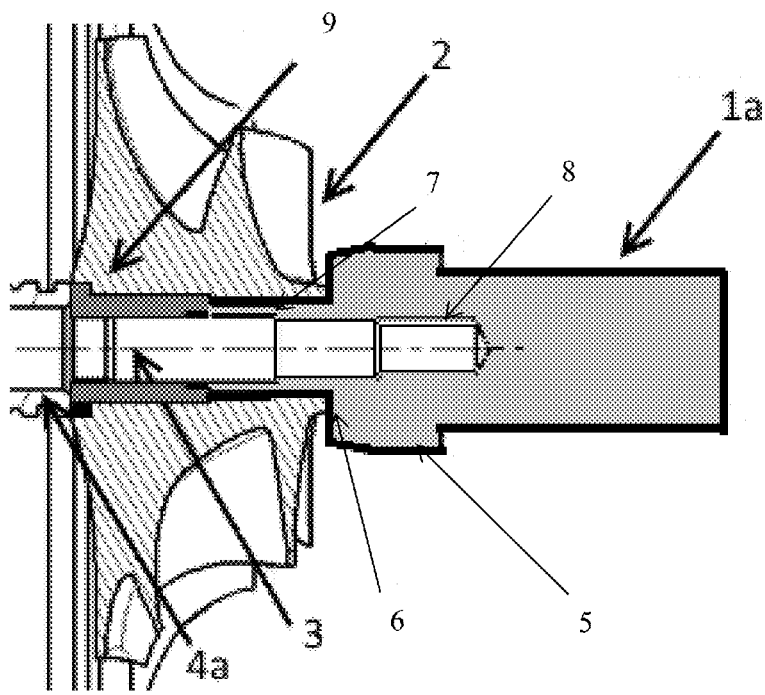
FIG. 4 shows a compression device driven by an electric machine according to a third embodiment of the invention.

FIG. 4 shows, diagrammatically and not in a non-limiting manner, a compression device (in particular a turbocharger) according to a third embodiment of the invention. In this figure, the different components of the rotor 1, that is the rotor shaft, the magnet, the shrink ring and optionally the non-magnetic stop, are not shown. The turbine part of the turbocharger is also not shown. FIG. 4 shows a system of assembling the electric rotor 1 on the turbocharger shaft 3 while ensuring the immobilization of the assembly and in particular of the compressor wheel 2. The elements identical to FIG. 2 will not be described in detail. The third embodiment in FIG. 4 differs from the first embodiment in FIG. 2 by the use of a tubular sleeve 9 between the compressor shaft 3 and the impeller wheel 2. The tubular sleeve comes into axial contact with the bearing 4a and with the cylindrical portion 7 of the rotor 1, optionally with a clearance. The tubular sleeve 9 includes a flange at its end in contact with the bearing ring 4. For this embodiment, the impeller wheel 2 includes an inner bore with a diameter greater than the conventional impeller wheel 2. The rotor 1 may comprise a handling adaptor 5.

Moreover, the invention relates to a method for manufacturing a compression device driven by an electric machine, the electric machine comprising a rotor and a stator, and the compression device comprising a compressor shaft and an impeller wheel. For this method, the following steps are implemented:

a) the impeller wheel is mounted on the compressor shaft;
  b) a cylindrical magnet is mounted on at least a part of a rotor shaft;
  c) the cylindrical magnet is held on the rotor shaft by a non-magnetic shrink ring, the non-magnetic shrink ring containing the magnet on the rotor shaft, the non-magnetic shrink ring is substantially cylindrical; and
  d) one end of the compressor shaft is inserted into a bore of the rotor shaft, and the compressor shaft is fastened to the rotor shaft.

Advantageously, the manufacturing method is intended to manufacture a compression device according to any combination of the variants described previously. For example, the manufacturing method can be intended to manufacture a compression device as described with reference to one of FIGS. 1 to 4.

According to an embodiment, during the step of inserting the compressor shaft into the bore of the rotor shaft, the rotor can contact the impeller wheel by flat surfaces in contact.

According to an embodiment, during the step of inserting the compressor shaft into the bore of the rotor shaft, a cylindrical portion of the rotor can be inserted into the impeller wheel. This cylindrical portion ensures a long centering of the rotor with respect to the compressor shaft, which allows the two shafts to be coaxial.

According to an aspect of the invention, the rotor shaft can be fastened to the compressor shaft by threading. To this end, a male thread can be provided on the end of the compressor shaft, and a female thread can be provided inside the bore of the rotor shaft. This fastening by threading is simple to implement and allows the correct position to be maintained.

For this embodiment, the rotor can be rotated by means of a handling adapter, for example the handling adapter includes a twelve-sided recess.

Alternatively, the rotor shaft can be fastened to the compressor shaft by any other known means, for example by means of pins and screws.

According to an embodiment of the method, the compression device, or optionally the turbocharger and the electric machine assembly can be installed in an air path of an internal combustion engine.

Advantageously, the electric machine can be placed in the air admission duct, so that the air flow, which enters into the compression device, first passes the electric machine. The advantage of this solution is twofold that the electric machine can be cooled by the flow of admission gas, and the admitted gas is heated by the electric machine, which can be favorable in certain modes of operation of the internal combustion engine.

The method can also include a step of installation of the stator around the rotor.

Advantageously, the manufacturing method according to the invention can relate to the electrification of a compression device or of a conventional turbocharger (equipped with an impeller wheel and a compressor shaft, but initially without electrical drive). To this end, the impeller wheel and the compressor shaft can be a compressor shaft and wheel for which steps a) to d) described above are carried out.

In this case, the process can include an additional step of boring the impeller wheel in order to insert therein at least the cylindrical portion of the rotor, and optionally the tubular sleeve.

Moreover, the invention is also suitable for energy production systems such as microturbines.

The invention claimed is:

1. A compression device of a fluid which is driven by an electric machine, the electric machine comprising a rotor including a rotor shaft and a stator, a compressor shaft on which is mounted at least one impeller wheel, the rotor being fastened to the compressor shaft, a cylindrical magnet mounted on at least a part of the rotor shaft, means comprising a shrink ring of non-magnetic material which compresses the magnet and axially holds the magnet on the rotor shaft to combat magnetic leakage, the rotor shaft including a bore for receiving one end of the compressor shaft, and at least one ring-shaped non-magnetic stop on one side of the magnet which is located between a shoulder of the rotor shaft and the magnet.

2. The compression device according to claim 1, wherein the rotor has an outer diameter less than a diameter of an inlet to one of the at least one impeller wheel.

3. The compression device according to claim 1, wherein the shrink ring comprises either titanium or carbon.

4. The compression device according to claim 1, wherein the rotor includes a portion having a diameter less than an end which is fastened to the compressor shaft, and the magnet is mounted on the portion having the diameter less than the end.

5. The compression device according to claim 1, wherein the rotor includes a flat surface which contacts a flat surface of an end of at least one of the at least one impeller wheel.

6. The compression device according to claim 1, wherein the rotor includes a cylindrical portion inserted into at least one of the at least one impeller wheel.

7. The compression device according to claim 6, wherein the cylindrical portion of the rotor has an axial length that is 1.5 times a diameter of the compressor shaft.

8. The compression device according to claim 6, comprising a tubular sleeve mounted on the compressor shaft which is located between one end of one of the at least one impeller wheel and the cylindrical portion of the rotor.

9. The compression device according claim 1, wherein the rotor is fastened to the compressor shaft by a screw thread.

10. The compression device according to claim 1, wherein the compression device is a turbocharger comprising a turbine and a compressor.

11. The compression device according to claim 10, wherein the electric machine is located at a gas inlet of the turbocharger.

12. A method for manufacturing a compression device comprising a rotor of an electric machine including a rotor shaft including a bore for receiving one end of a compressor shaft and a stator of the electric machine, a compressor shaft and at least one impeller wheel which is driven by the electric machine, the method comprising:
  a) mounting the at least one impeller wheel on the compressor shaft;
  b) mounting a cylindrical magnet on at least a part of the rotor shaft;
  c) attaching the cylindrical magnet to the rotor shaft by a non-magnetic shrink ring which axially holds and compresses the cylindrical magnet on the rotor shaft and combats magnetic rotor leakage;
  d) inserting a ring-shaped non-magnetic stop on a side of the cylindrical magnet which is located between a shoulder of the rotor shaft and the cylindrical magnet; and
  e) inserting one end of the compressor shaft into a bore of the rotor shaft, and fastening the compressor shaft to the rotor shaft to hold the non-magnetic stop against the shoulder.

13. The method of manufacturing according to claim 12, comprising inserting the compressor shaft into the bore of the rotor shaft so that the rotor abuts the at least one impeller wheel by contact with flat surfaces.

14. The manufacturing method according to claim 12, comprising inserting the compressor shaft into the bore of the rotor shaft while a cylindrical portion of the rotor is inserted into the at least one impeller wheel.

15. The manufacturing method according to claim 12, comprising screwing the rotor shaft into to an end of the shaft of the compressor.

* * * * *